US009147072B2

United States Patent
Fawaz et al.

(10) Patent No.: US 9,147,072 B2
(45) Date of Patent: *Sep. 29, 2015

(54) METHOD AND SYSTEM FOR PERFORMING BEHAVIORAL ANALYSIS OPERATIONS IN A MOBILE DEVICE BASED ON APPLICATION STATE

(71) Applicant: QUALCOMM Incorporated, San Diego, CA (US)

(72) Inventors: Kassem Fawaz, Ann Arbor, MI (US); Vinay Sridhara, Santa Clara, CA (US); Rajarshi Gupta, Sunnyvale, CA (US); Mihai Christodorescu, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/064,437

(22) Filed: Oct. 28, 2013

(65) Prior Publication Data

US 2015/0121524 A1    Apr. 30, 2015

(51) Int. Cl.
*G06F 7/04* (2006.01)
*G06F 17/30* (2006.01)
*H04N 7/16* (2011.01)
*G06F 21/56* (2013.01)
*G06F 21/55* (2013.01)

(52) U.S. Cl.
CPC ............ *G06F 21/566* (2013.01); *G06F 21/552* (2013.01)

(58) Field of Classification Search
CPC ..................................... G06F 21/566
USPC ......................................... 726/22, 23
See application file for complete search history.

(56) References Cited

U.S. PATENT DOCUMENTS

| 7,546,629 | B2 * | 6/2009 | Albert et al. ................. 726/1 |
| 8,898,788 | B1 * | 11/2014 | Aziz et al. .................... 726/24 |
| 2008/0109870 | A1 * | 5/2008 | Sherlock et al. .............. 726/1 |
| 2012/0210423 | A1 | 8/2012 | Friedrichs et al. |

(Continued)

FOREIGN PATENT DOCUMENTS

| EP | 1542115 A1 | 6/2005 |
| EP | 2388727 B1 | 7/2013 |

(Continued)

*Primary Examiner* — Thanhnga B Truong
*Assistant Examiner* — Khalil Naghdali
(74) *Attorney, Agent, or Firm* — The Marbury Law Group, PLLC

(57) ABSTRACT

Methods, systems and devices use operating system execution states while monitoring applications executing on a mobile device to perform comprehensive behavioral monitoring and analysis include configuring a mobile device to monitor an activity of a software application, generate a shadow feature value that identifies an operating system execution state of the software application during that activity, generate a behavior vector that associates the monitored activity with the shadow feature value, and determine whether the activity is malicious or benign based on the generated behavior vector, shadow feature value and/or operating system execution states. The mobile device may also be configured to intelligently determine whether the operating system execution state of a software application is relevant to determining whether any of the monitored mobile device behaviors are malicious or suspicious, and monitor only the operating system execution states of the software applications for which such determinations are relevant.

9 Claims, 10 Drawing Sheets

(56) References Cited

U.S. PATENT DOCUMENTS

| | | |
|---|---|---|
| 2013/0019311 A1* | 1/2013 | Swildens et al. .............. 726/23 |
| 2013/0031599 A1 | 1/2013 | Luna et al. |
| 2013/0097706 A1 | 4/2013 | Titonis et al. |
| 2013/0160128 A1* | 6/2013 | Dolan-Gavitt et al. ......... 726/25 |
| 2014/0331327 A1* | 11/2014 | Maor et al. ..................... 726/25 |

FOREIGN PATENT DOCUMENTS

| | | |
|---|---|---|
| WO | 2006028558 A1 | 3/2006 |
| WO | 2012102827 A2 | 8/2012 |

* cited by examiner

| Importance Value | Description |
| --- | --- |
| IMPORTANCE_BACKGROUND (400) | Process contains background code that is expendable |
| IMPORTANCE_EMPTY (500) | Process is empty of any actively running code |
| IMPORTANCE_FOREGROUND (100) | Process is running in the foreground user interface |
| IMPORTANCE_PERCEPTIBLE (130) | Processes is actively perceptible to the user |
| IMPORTANCE_SERVICE (300) | Process contains services that should remain running |
| IMPORTANCE_VISIBLE (200) | Process is actively visible to the user but not in the immediate foreground user interface |

FIG. 5

METHOD AND SYSTEM FOR PERFORMING BEHAVIORAL ANALYSIS OPERATIONS IN A MOBILE DEVICE BASED ON APPLICATION STATE

BACKGROUND

Mobile and wireless technologies have seen explosive growth over the past several years. This growth has been fueled by better communications, hardware, and more reliable protocols. Wireless service providers are now able to offer their customers an ever-expanding array of features and services, and provide users with unprecedented levels of access to information, resources, and communications. To keep pace with these enhancements, mobile electronic devices (e.g., cellular phones, watches, headphones, remote controls, etc.) have become more complex than ever, and now commonly include multiple processors, system-on-chips (SoCs), and other resources that allow mobile device users to execute complex and power intensive software applications (e.g., video streaming, video processing, etc.) on their mobile devices. With this rise in complexity and power consumption, new and improved processing solutions that better utilize the mobile device's resources and capabilities will be beneficial to consumers.

SUMMARY

The various aspects include methods of observing mobile device behaviors over a period of time to recognize mobile device behaviors that are inconsistent with normal operation patterns of the mobile device. In an aspect, the methods may including monitoring in a processor of a mobile device an activity of a software application or process, determining an operating system execution state of the software application/process, and determining whether the activity is malicious or benign based on the activity and/or the operating system execution state of the software application or process during which the activity was monitored.

In an further aspect, the method may include determining whether the operating system execution state of the software application or process is relevant to the activity, generating a shadow feature value that identifies the operating system execution state of the software application or process during which the activity was monitored when it is determined that the operating system execution state is relevant to the activity, and generating a behavior vector that associates the activity with the shadow feature value identifying the operating system execution state. In an aspect, determining whether the activity is malicious or benign based on the activity and the operating system execution state of the software application or process during which the activity was monitored includes determining whether the activity is malicious or benign based on the behavior vector.

In an aspect, generating the behavior vector may include associating the activity with the operating system execution state of the software application or process in which the activity was performed. In an aspect, determining whether the activity is malicious or benign based on the behavior vector may include applying the behavior vector to a classifier model. In a further aspect, the method may include updating the classifier model based on a result of monitoring the activity.

Further aspects include a mobile computing device having a processor configured with processor-executable instructions to perform operations that include monitoring an activity of a software application or process, determining an operating system execution state of the software application or process, and determining whether the activity is malicious or benign based on the activity and the operating system execution state of the software application or process during which the activity was monitored.

In a further aspect, the processor may be configured with processor-executable instructions to perform operations further including determining whether the operating system execution state of the software application or process is relevant to the activity, generating a shadow feature value that identifies the operating system execution state of the software application or process during which the activity was monitored when it is determined that the operating system execution state is relevant to the activity, and generating a behavior vector that associates the activity with the shadow feature value identifying the operating system execution state. In an aspect, the processor may be configured with processor-executable instructions to perform operations such that determining whether the activity is malicious or benign based on the activity may include determining whether the activity is malicious or benign based on the behavior vector.

an aspect, the processor may be configured with processor-executable instructions to perform operations such that generating the behavior vector includes associating the activity with the operating system execution state of the software application or process in which the activity was performed. In an aspect, the processor may be configured with processor-executable instructions to perform operations such that determining whether the activity is malicious or benign based on the behavior vector includes applying the behavior vector to a classifier model. In a further aspect, the processor may be configured with processor-executable instructions to perform operations further including updating the classifier model based on a result of monitoring the activity.

Further aspects include a non-transitory processor-readable storage medium having stored thereon processor-executable instructions configured cause a mobile device processor to perform operations that may include monitoring an activity of a software application or process, determining an operating system execution state of the software application or process, and determining whether the activity is malicious or benign based on the activity and the operating system execution state of the software application or process during which the activity was monitored.

In an aspect, the stored processor-executable software instructions may be configured to cause the mobile device processor to perform operations that include determining whether the operating system execution state of the software application or process is relevant to the activity, generating a shadow feature value that identifies the operating system execution state of the software application or process during which the activity was monitored when it is determined that the operating system execution state is relevant to the activity, and generating a behavior vector that associates the activity with the shadow feature value identifying the operating system execution state. The stored processor-executable software instructions may be configured so that determining whether the activity is malicious or benign based on the activity includes determining whether the activity is malicious or benign based on the behavior vector.

In an aspect, the stored processor-executable software instructions may be configured to cause the mobile device processor to perform operations such that generating the behavior vector includes associating the activity with the operating system execution state of the software application or process in which the activity was performed. In an aspect, the stored processor-executable software instructions may be configured to cause the mobile device processor to perform operations such that determining whether the activity is malicious or benign based on the behavior vector includes applying the behavior vector to a classifier model. In a further aspect, the stored processor-executable software instructions may be configured to cause the mobile device processor to perform operations further including updating the classifier model based on a result of monitoring the activity.

BRIEF DESCRIPTION OF THE DRAWINGS

The accompanying drawings, which are incorporated herein and constitute part of this specification, illustrate exemplary aspect of the invention, and together with the general description given above and the detailed description given below, serve to explain the features of the invention.

FIG. 5 is a table diagram illustrating various operating system execution states that may be used when determining whether a mobile device behavior is benign or malicious in various aspects.

DETAILED DESCRIPTION

Figure 1:
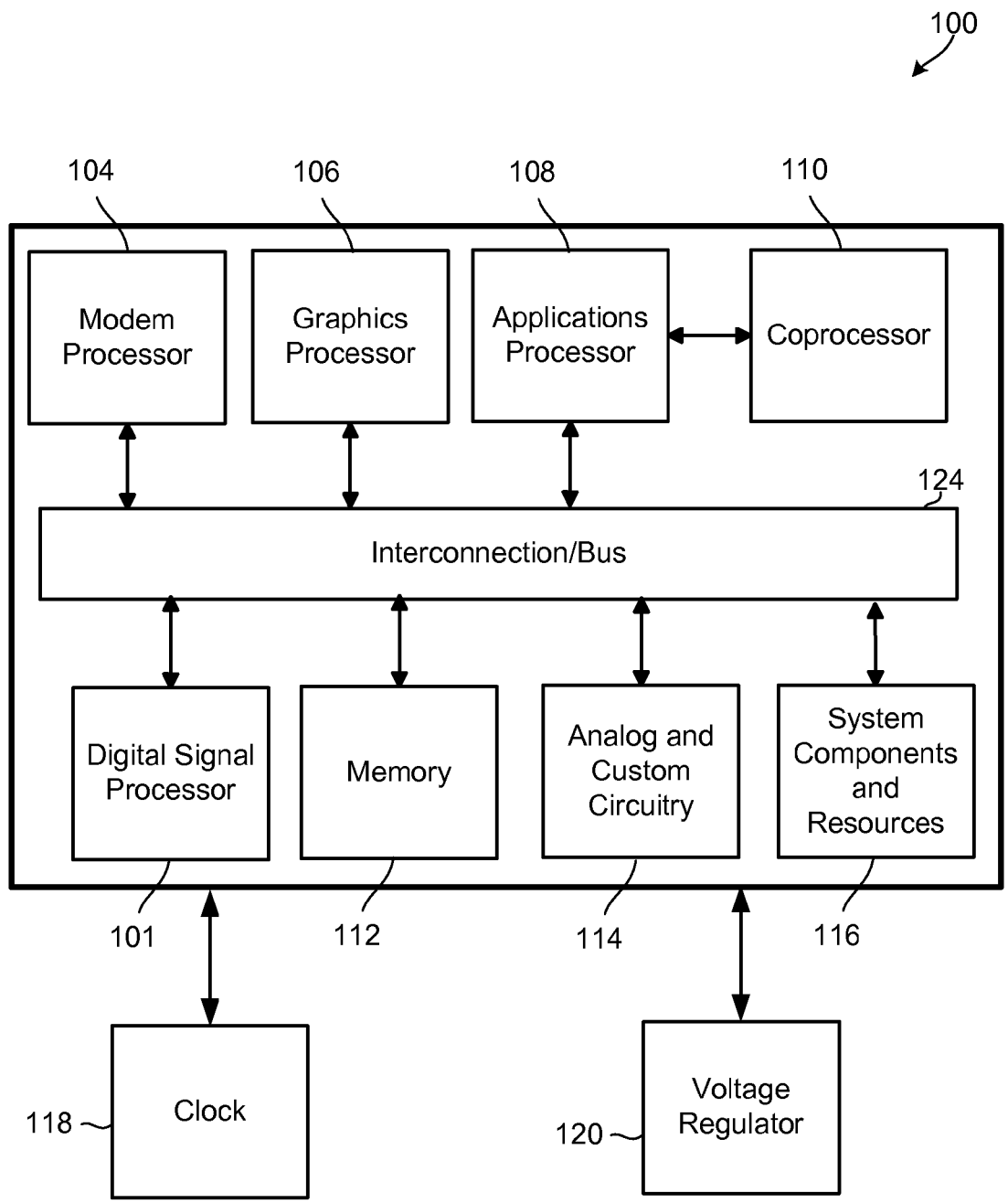
FIG. 1 is a component block diagram of an example system on chip suitable for implementing the various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In overview, the various aspects include methods, and mobile devices configured to implement the methods, of using the operating system execution states associated with software applications or processes executing on the mobile device to improve the accuracy and performance of a comprehensive behavioral monitoring and analysis system and to enable the mobile device to better predict whether a mobile device behavior is benign, suspicious, malicious, or performance degrading. In an aspect, a mobile device processor may be configured to monitor an activity of a software application, generate a shadow feature value that identifies an operating system execution state of the software application during that activity, generate a behavior vector that associates the monitored activity with the shadow feature value, and determine whether the activity is malicious or benign based on the generated behavior vector, shadow feature value and/or operating system execution states. In a further aspect, the mobile device processor may be configured to intelligently determine whether the operating system execution state of a software application is relevant to determining whether any of the monitored mobile device behaviors are malicious or suspicious, and monitor only the operating system execution states of the software applications for which such determinations are relevant.

The terms "mobile computing device" and "mobile device" are used interchangeably herein to refer to any one or all of cellular telephones, smartphones, personal or mobile multi-media players, personal data assistants (PDA's), laptop computers, tablet computers, smartbooks, ultrabooks, palmtop computers, wireless electronic mail receivers, multimedia Internet enabled cellular telephones, wireless gaming controllers, and similar personal electronic devices which include a memory, a programmable processor for which performance is important, and operate under battery power such that power conservation methods are of benefit. While the various aspects are particularly useful for mobile computing devices that have limited resources and run on battery power, such as smartphones, the aspects are generally useful in any electronic device that includes a processor and executes application programs.

The term "performance degradation" is used herein to refer to a wide variety of undesirable mobile device operations and characteristics, such as longer processing times, slower real time responsiveness, lower battery life, loss of private data, malicious economic activity (e.g., sending unauthorized premium Short Message Service messages, etc.), denial of service (DoS), operations relating to commandeering, etc.

Generally, the performance and power efficiency of a mobile device degrade over time. Recently, anti-virus companies (e.g., McAfee, Symantec, etc.) have begun marketing mobile anti-virus, firewall, and encryption products that aim to slow this degradation. However, many of these solutions rely on the periodic execution of a computationally-intensive scanning engine on the mobile device, which may consume many of the mobile device's processing and battery resources, slow or render the mobile device useless for extended periods of time, and/or otherwise degrade the user experience. In addition, these solutions are typically limited to detecting known viruses and malware, and do not address the multiple complex factors and/or the interactions that often combine to contribute to a mobile device's degradation over time (e.g., when the performance degradation is not caused by viruses or malware). For these and other reasons, existing anti-virus, firewall, and encryption products do not provide adequate solutions for identifying the numerous factors that may contribute to a mobile device's degradation over time, for preventing mobile device degradation, or for efficiently restoring an aging mobile device to its original condition.

Mobile devices are resource constrained systems that have relatively limited processing, memory, and energy resources. Modern mobile devices are also complex systems, and there are a large variety of factors that may contribute to the degradation in performance and power utilization levels of the mobile device over time, including poorly designed software applications, malware, viruses, fragmented memory, background processes, etc. Due to the number, variety, and complexity of these factors, it is often not feasible to evaluate all the various processes, components, behaviors, or factors (or combinations thereof) that may degrade performance and/or power utilization levels of the complex yet resource-constrained systems of modern mobile devices. As such, it is difficult for users, operating systems, and/or application programs (e.g., anti-virus software, etc.) to accurately and efficiently identify the sources of such problems. Therefore, mobile device users currently have few remedies for preventing the degradation in performance and power utilization levels of a mobile device over time, or for restoring an aging mobile device to its original performance and power utilization levels.

The various aspects include mobile devices, systems, and methods for intelligently and efficiently identifying, preventing, and/or correcting the factors, conditions and/or mobile device behaviors that often degrade a mobile device's performance and/or power utilization levels over time. By monitoring the operating system execution states of select software applications (or processes, threads, etc.), the various aspects allow the mobile device to better predict whether a behavior is benign or malicious. Further, by intelligently determining whether the operating system execution state of a software application is relevant to the determination of whether a behavior is benign or malicious and selecting for monitoring only the software applications (or processes, threads, etc.) for which such determinations are relevant, the various aspects allow a mobile device to better focus its operations and identify performance-degrading behaviors/factors without consuming an excessive amount of processing, memory, or energy resources of the mobile device.

In an aspect, an observer process, daemon, module, or sub-system (herein collectively referred to as a "module") of the mobile device may instrument or coordinate various application programming interfaces (APIs), registers, counters, or other components (herein collectively "instrumented components") at various levels of the mobile device system, and collect behavior information from the instrumented components. The observer module may continuously (or near continuously) observe or monitor the instrumented components to recognize mobile device behaviors that are inconsistent with normal operation patterns. The mobile device may also include an analyzer module, and the observer module may communicate (e.g., via a memory write operation, function call, etc.) the collected behavior information to the analyzer module. The analyzer module may receive the collected behavior information, and analyze and/or classify the collected behavior information, generate behavior vectors, generate spatial and/or temporal correlations based on the behavior vector and information collected from various other mobile device sub-systems, and determine whether a particular mobile device behavior, software application, or process is benign, suspicious, or malicious/performance-degrading.

In the various aspects, the observer module may be further configured to monitor the operating system execution states associated with select activities, tasks, processes, or software applications (e.g., operating system state in which certain software applications were executing when a mobile device behavior was observed), and the analyzer module may be configured to receive and use this operating system execution state information to better determine the intent (malicious vs. benign) of a software application and/or to better determine whether a mobile device behavior is performance-degrading or benign.

Each software application generally performs a number of tasks or activities on the mobile device. Certain tasks/activities inherently require that the operating system or software application (or process, thread, etc.) be in an execution state that supports or is compatible with those tasks/activities. For example, the use of a camera, activating a microphone to record audio, sending Short Message Service (SMS) messages, and the collection accelerometer data are all tasks/activities that typically require some form of user interaction with the mobile device (e.g., the user actuating the shutter-release button for the camera, typing text, hitting a send button, etc.). As such, these activities generally must be performed in the foreground or in an execution state that supports user interaction with the mobile device. When these or other similar tasks/activities are performed in an execution state that does not support a high degree of user interaction with the mobile device, such as in the background execution state, such an operating condition may be a strong indicator that a mobile device behavior associated with that activity is malicious or otherwise merits additional or closer scrutiny, monitoring or analysis. That is, the specific operating system execution state in which certain tasks/activities are performed in the mobile device may be a strong indicator of whether a mobile device behavior merits additional or closer scrutiny, monitoring and/or analysis. As such, in the various aspects, a mobile device may be configured to use information identifying the specific operating system execution states in which certain tasks/activities are performed to focus its behavioral monitoring and analysis operations and better determine whether a mobile device behavior is benign, suspicious, or malicious/performance-degrading.

In various aspects, the observer and/or analyzer modules may be configured to associate the activities/tasks performed by a software application with the operating system execution states in which those activities/tasks were performed. For example, the observer module may be configured to generate a behavior vector that includes the behavior information collected from monitoring the instrumented components in a sub-vector or data-structure that lists the features, activities, or operations of the software for which the execution state is relevant (e.g., location access, SMS read operations, sensor access, etc.). In an aspect, this sub-vector/data-structure may be stored in association with a shadow feature value sub-vector/data-structure that identifies the operating system execution state in which each feature/activity/operation was observed. As an example, the observer module may generate a behavior vector that includes a "location background" data field whose value identifies the number or rate that the software application accessed location information when it was operating in the background state. This allows the analyzer module to analyze this execution state information independent of and/or in parallel with the other observed behaviors of the mobile device. Generating the behavior vector in this manner also allows the system to aggregate information (e.g., frequency or rate) over time.

In various aspects, the observer module and/or analyzer module may be configured to generate the behavior vectors to include a concise definition of the observed behaviors. The behavior vector may succinctly describe an observed behavior of the mobile device, software application, or process in a value or vector data-structure (e.g., in the form of a string of numbers, etc.). The behavior vector may also function as an identifier that enables the mobile device system to quickly recognize, identify, and/or analyze mobile device behaviors. In the various aspects, the observer and/or analyzer modules may be configured to generate the behavior vectors to include series of numbers, each of which signifies a feature or a behavior of the mobile device. For example, numbers included in the behavior vector may signify whether a camera of the mobile device is in use (e.g., as zero or one), how much network traffic has been transmitted from or generated by the mobile device (e.g., 20 KB/sec, etc.), how many interne messages have been communicated (e.g., number of SMS messages, etc.), etc.

In various aspects, the observer and/or analyzer modules may be configured to generate the behavior vectors to include operating state execution information. The operating state execution information may be included in the behavior vector as part of a behavior (e.g., camera used 5 times in 3 second by a background process, camera used 3 times in 3 second by a foreground process, etc.) or as part of an independent feature. In an aspect, the operating state execution information may be included in the behavior vector as a shadow feature value sub-vector or data structure. In an aspect, the behavior vector may store the shadow feature value sub-vector/data structure in association with the features, activities, tasks for which the operating state execution information is relevant.

In an aspect, the analyzer module may be configured to perform real-time analysis operations, which may include applying data, algorithms, classifiers, and/or behavior models to behavior vectors to determine whether a mobile device behavior is benign, suspicious, or malicious/performance-degrading. A classifier model may be a full classifier model generated as a function of a robust training dataset that includes thousands of features and billions of entries. A classifier model may also be a lean classifier model that is generated by selecting from a full (or near full) classifier model a reduced model that includes features or entries that are most relevant for determining whether a particular mobile device behavior, software application, or process is benign, suspicious, or malicious/performance-degrading. In an aspect, the mobile device processor may be configured to generate a lean classifier model from a full classifier model. Since lean data/behavior models include a reduced and focused subset of the relevant information, the mobile device may use the lean data/behavior models to determine whether a mobile device behavior is malicious/performance-degrading or benign without consuming an excessive amount of processing, memory, or energy resources of the mobile device.

In various aspects, a mobile device processor may be configured to generate the full and/or lean classifier models to include operating state execution information that is suitable for use in determining whether a monitored activity of the mobile device is benign, suspicious, or malicious/performance-degrading based on the collected behavior information or generated behavior vectors. In a further aspect, the mobile device processor may be configured to intelligently determine whether the operating system execution state of a software application or process is relevant to determining whether any of the monitored mobile device behaviors or activities are malicious or suspicious, and generate the lean classifier models to include operating state execution information for only the activities/features for which the operating state execution information is determined to be relevant. Thus, the lean classifier may be generated to include operating state execution information for some activities or features and not for others.

In various aspects, the mobile device may be configured to generate or update the lean classifier models by performing, executing, and/or applying machine learning and/or context modeling techniques to the collected behavior information, the operating system executions state information, and/or the results of the behavioral analysis operations. The mobile device may continuously reevaluate its lean data/behavior models based on operating system execution state information, historical information (e.g., collected from prior executions, previous applications of behavior models, etc.), new information, machine learning, context modeling, and detected changes in the available information, mobile device states, environmental conditions, network conditions, mobile device performance, battery consumption levels, etc.

In various aspects, the mobile device may be configured to use information generated or obtained from the execution or application of classifier models to improve the accuracy and/or efficiency of the models. That is, each execution or application of a classifier model to collected behavior information may provide information suitable for generating more focused or accurate classifier models. For example, if a result of applying a classifier model to behavior information collected on the mobile device identifies network usage in excess of 1 Mbps as being malicious, and the mobile device determines that a monitored process is consuming 1.5 Mbps of network resources, the system may label the process malicious and strengthen the applied model (e.g., increase the weight given to the accuracy of the model, etc.). As another example, if the mobile device determines that an application consuming 0.50 Mbps of network resources while executing in the background operating state is malicious (due to other attributes), the system may lower the threshold for the consumption of network resources to 0.4 Mbps for similar processes executing in the background. A mobile device may be configured to use such information to improve the performance, accuracy and/or efficiency of the classifier models.

Different activities or features may have different implications based on the operating system execution state in which they are executed. As a result, the thresholds of activities/features may be different depending on the software application's state (0 or 1 if it is an existence query, etc.). The same activity/feature may have a different threshold for a first operating system execution state and for a second operating system execution state. For example, a classifier model may set the threshold for the feature of sampling a global positioning system (GPS) sensor by a foreground process to be equal to ten times in one second, and set the threshold sampling the same GPS sensor by a background process to be equal to twice in one second.

Some features have relevant foreground values that correlate with the application's functionalities. For example, the mobile device's GPS sensors are expected to sample the user's location more frequently when the corresponding software application is running in the foreground or perceptible to the user as this behavior is more evident in navigation and sport tracking applications. As another example, WiFi state sampling in the mobile device may be expected to occur more frequently in the foreground execution state than the background execution state. This is because WiFi state sampling may be used more frequently by navigation based applications executing in the foreground, such as systems that are suited for indoor use. That is, when such indoor navigation systems execute in foreground, there is a higher number of positioning packets (e.g. RTS/CTS transactions) than when the indoor navigation systems execute in the background, and this information may be used by the mobile device when determining whether a mobile device behavior is malicious or benign. As a further example, inertial sensors (accelerometer, compass, gyro, etc.) may be sampled more frequently in the foreground execution state when used by gaming applications and navigation related applications, and thus the threshold for the sampling of these sensors may be set differently based on their execution state. In addition, user interface (UI) events may be more relevant to the determination of whether a mobile device behavior is malicious or benign when they are generated, received, or performed by a software application executing in the background state, since many applications are expected to receive UI events in the foreground. Similarly, near field communications performed in the foreground may be relevant to determining whether the software applications related to beaming content and mobile payments will make use of NFC, while similar near-field communication (NFC) activities occurring in the background may indicate malicious behavior.

The various aspects may be implemented in a number of different mobile devices, including single processor and multiprocessor systems, and a system-on-chip (SOC). FIG. 1 illustrates an example SOC 100 architecture that may be used in computing devices implementing the various aspects. The SOC 100 may include a number of heterogeneous processors, such as a digital signal processor (DSP) 101, a modem processor 104, a graphics processor 106, and an application processor 108. The SOC 100 may also include one or more coprocessors 110 (e.g., vector co-processor) connected to one or more of the heterogeneous processors 101, 104, 106, 108. Each processor 101, 104, 106, 108, 110 may include one or more cores, and each processor/core may perform operations independent of the other processors/cores. For example, the SOC 100 may include a processor that executes a first type of operating system (e.g., FreeBSD, LINIX, OS X, etc.) and a processor that executes a second type of operating system (e.g., Microsoft Windows 8).

The SOC 100 may also include analog circuitry and custom circuitry 114 for managing sensor data, analog-to-digital conversions, wireless data transmissions, and for performing other specialized operations, such as processing encoded audio signals for games and movies. The SOC 100 may further include system components and resources 116, such as voltage regulators, oscillators, phase-locked loops, peripheral bridges, data controllers, memory controllers, system controllers, access ports, timers, and other similar components used to support the processors and clients running on a computing device.

The system components/resources 116 and custom circuitry 114 may include circuitry to interface with peripheral devices, such as cameras, electronic displays, wireless communication devices, external memory chips, etc. The processors 101, 104, 106, 108 may be interconnected to one or more memory elements 112, system components, and resources 116 and custom circuitry 114 via an interconnection/bus module 124, which may include an array of reconfigurable logic gates and/or implement a bus architecture (e.g., CoreConnect, AMBA, etc.). Communications may be provided by advanced interconnects, such as high performance networks-on chip (NoCs).

The SOC 100 may further include an input/output module (not illustrated) for communicating with resources external to the SOC, such as a clock 118 and a voltage regulator 120. Resources external to the SOC (e.g., clock 118, voltage regulator 120) may be shared by two or more of the internal SOC processors/cores (e.g., DSP 101, modem processor 104, graphics processor 106, applications processor 108, etc.).

The SOC 100 may also include hardware and/or software components suitable for collecting sensor data from sensors, including speakers, user interface elements (e.g., input buttons, touch screen display, etc.), microphone arrays, sensors for monitoring physical conditions (e.g., location, direction, motion, orientation, vibration, pressure, etc.), cameras, compasses, GPS receivers, communications circuitry (e.g., Bluetooth®, WLAN, WiFi, etc.), and other well known components (e.g., accelerometer, etc.) of modern electronic devices.

In addition to being implemented in an SOC 100 discussed above, the various aspects may be implemented in a wide variety of computing systems, which may include a single processor, multiple processors, multicore processors, or any combination thereof.

Figure 2:
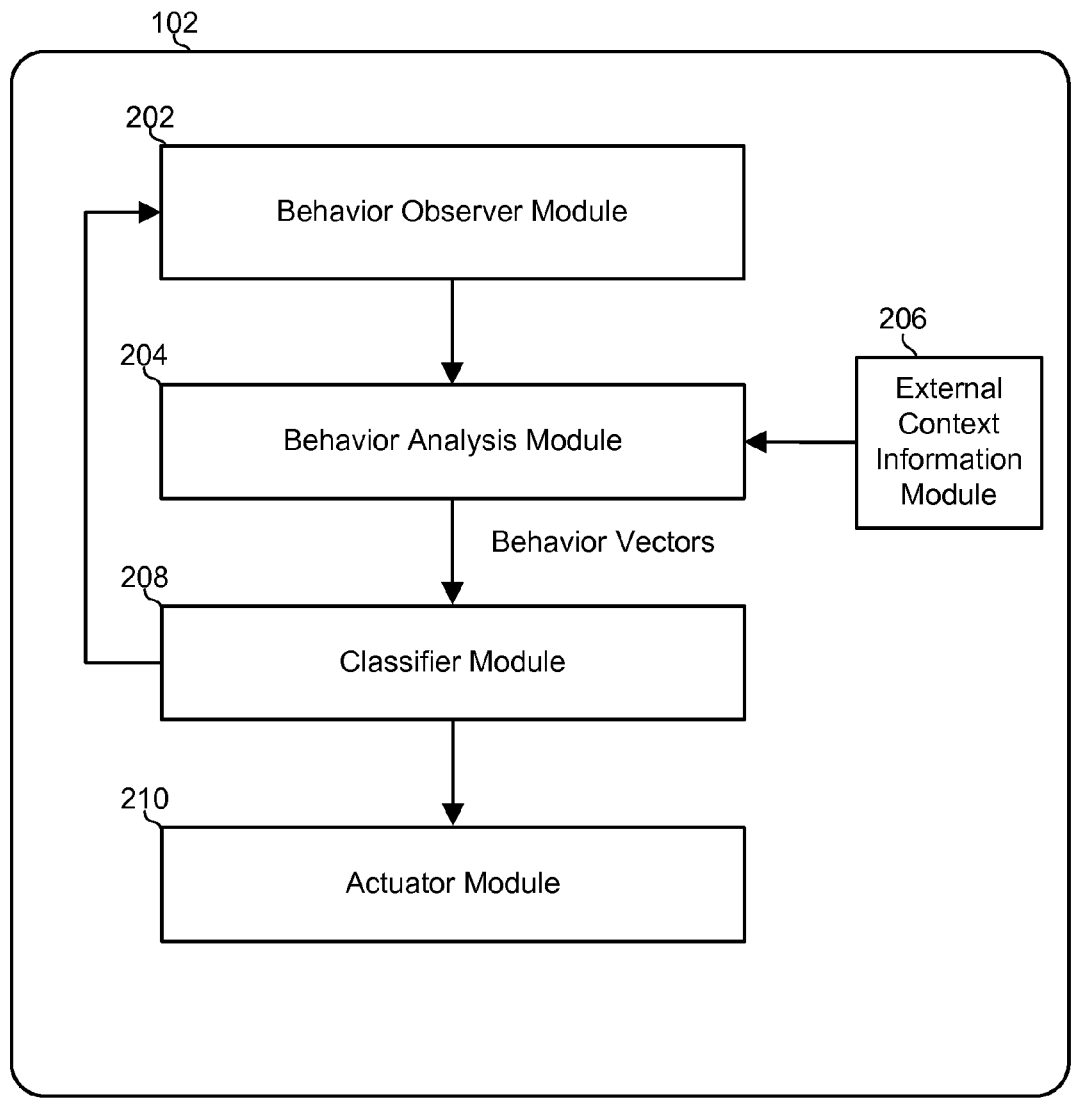
FIG. 2 is a block diagram illustrating logical components and information flows in an example computing system configured to perform dynamic and adaptive behavioral observation and analysis operations in accordance with the various aspects.

FIG. 2 illustrates example logical components and information flows in an aspect mobile device 102 configured to determine whether a particular mobile device behavior, software application, or process is malicious/performance-degrading, suspicious, or benign. In the example illustrated in FIG. 2, the mobile device 102 includes a behavior observer module 202, a behavior analyzer module 204, an external context information module 206, a classifier module 208, and an actuator module 210. In an aspect, the classifier module 208 may be implemented as part of the behavior analyzer module 204. In an aspect, the behavior analyzer module 204 may be configured to generate one or more classifier modules 208, each of which may include one or more classifiers.

Each of the modules 202-210 may be implemented in software, hardware, or any combination thereof. In various aspects, the modules 202-210 may be implemented within parts of the operating system (e.g., within the kernel, in the kernel space, in the user space, etc.), within separate programs or applications, in specialized hardware buffers or processors, or any combination thereof. In an aspect, one or more of the modules 202-210 may be implemented as software instructions executing on one or more processors of the mobile device 102.

The behavior observer module 202 may be configured to instrument or coordinate application programming interfaces (APIs) at various levels/modules of the mobile device, and monitor/observe mobile device operations and events (e.g., system events, state changes, etc.) at the various levels/modules over a period of time via the instrumented APIs, collect information pertaining to the observed operations/events, intelligently filter the collected information, generate one or more observations based on the filtered information, and store the generated observations in a memory (e.g., in a log file, etc.) and/or send (e.g., via memory writes, function calls, etc.) the generated observations to the behavior analyzer module 204.

The behavior observer module 202 may monitor/observe mobile device operations and events by collecting information pertaining to library application programming interface (API) calls in an application framework or run-time libraries, system call APIs, file-system and networking sub-system operations, device (including sensor devices) state changes, and other similar events. The behavior observer module 202 may also monitor file system activity, which may include searching for filenames, categories of file accesses (personal info or normal data files), creating or deleting files (e.g., type exe, zip, etc.), file read/write/seek operations, changing file permissions, etc.

The behavior observer module 202 may also monitor data network activity, which may include types of connections, protocols, port numbers, server/client that the device is connected to, the number of connections, volume or frequency of communications, etc. The behavior observer module 202 may monitor phone network activity, which may include monitoring the type and number of calls or messages (e.g., SMS, etc.) sent out, received, or intercepted (e.g., the number of premium calls placed).

The behavior observer module 202 may also monitor the system resource usage, which may include monitoring the number of forks, memory access operations, number of files open, etc. The behavior observer module 202 may monitor the state of the mobile device, which may include monitoring various factors, such as whether the display is on or off, whether the device is locked or unlocked, the amount of battery remaining, the state of the camera, etc. The behavior observer module 202 may also monitor inter-process communications (IPC) by, for example, monitoring intents to crucial services (browser, contracts provider, etc.), the degree of inter-process communications, pop-up windows, etc.

The behavior observer module 202 may also monitor/observe driver statistics and/or the status of one or more hardware components, which may include cameras, sensors, electronic displays, WiFi communication components, data controllers, memory controllers, system controllers, access ports, timers, peripheral devices, wireless communication components, external memory chips, voltage regulators, oscillators, phase-locked loops, peripheral bridges, and other similar components used to support the processors and clients running on the mobile computing device.

The behavior observer module 202 may also monitor/observe one or more hardware counters that denote the state or status of the mobile computing device and/or mobile device sub-systems. A hardware counter may include a special-purpose register of the processors/cores that is configured to store a count or state of hardware-related activities or events occurring in the mobile computing device.

The behavior observer module 202 may also monitor/observe actions or operations of software applications, software downloads from an application download server (e.g., Apple® App Store server), mobile device information used by software applications, call information, text messaging information (e.g., SendSMS, BlockSMS, ReadSMS, etc.), media messaging information (e.g., ReceiveMMS), user account information, location information, camera information, accelerometer information, browser information, content of browser-based communications, content of voice-based communications, short range radio communications (e.g., Bluetooth, WiFi, etc.), content of text-based communications, content of recorded audio files, phonebook or contact information, contacts lists, etc.

The behavior observer module 202 may monitor/observe transmissions or communications of the mobile device, including communications that include voicemail (VoiceMailComm), device identifiers (DeviceIDComm), user account information (UserAccountComm), calendar information (CalendarComm), location information (LocationComm), recorded audio information (RecordAudioComm), accelerometer information (AccelerometerComm), etc.

The behavior observer module 202 may monitor/observe usage of and updates/changes to compass information, mobile device settings, battery life, gyroscope information, pressure sensors, magnet sensors, screen activity, etc. The behavior observer module 202 may monitor/observe notifications communicated to and from a software application (AppNotifications), application updates, etc. The behavior observer module 202 may monitor/observe conditions or events pertaining to a first software application requesting the downloading and/or install of a second software application. The behavior observer module 202 may monitor/observe conditions or events pertaining to user verification, such as the entry of a password, etc.

The behavior observer module 202 may be configured to monitor/observe any of the mobile device behaviors over a period of time. These observations may be for a set period of time or may be cumulative, such as in a continuous learning process. Thus, the longer that the mobile device operates, the more behavioral observations may be collected.

The behavior observer module 202 may also monitor/observe conditions or events at multiple levels of the mobile device, including the application level, radio level, and sensor level. Application level observations may include observing the user via facial recognition software, observing social streams, observing notes entered by the user, observing events pertaining to the use of PassBook/Google Wallet/Paypal/etc. Application level observations may also include observing events relating to the use of virtual private networks (VPNs) and events pertaining to synchronization, voice searches, voice control (e.g., lock/unlock a phone by saying one word), language translators, the offloading of data for computations, video streaming, camera usage without user activity, microphone usage without user activity, etc.

Radio level observations may include determining the presence, existence or amount of any or more of user interaction with the mobile device before establishing radio communication links or transmitting information, dual/multiple subscriber identification module (SIM) cards, Internet radio, mobile phone tethering, offloading data for computations, device state communications, the use as a game controller or home controller, vehicle communications, mobile device synchronization, etc. Radio level observations may also include monitoring the use of radios (WiFi, WiMax, Bluetooth, etc.) for positioning, peer-to-peer (p2p) communications, synchronization, vehicle to vehicle communications, and/or machine-to-machine (m2m). Radio level observations may further include monitoring network traffic usage, statistics, or profiles.

Sensor level observations may include monitoring a magnet sensor or other sensor to determine the usage and/or external environment of the mobile device. For example, the mobile device processor may be configured to determine whether the phone is in a holster (e.g., via a magnet sensor configured to sense a magnet within the holster) or in the user's pocket (e.g., via the amount of light detected by a camera or light sensor). Detecting that the mobile device is in a holster may be relevant to recognizing suspicious behaviors, for example, because activities and functions related to active usage by a user (e.g., taking photographs or videos, sending messages, conducting a voice call, recording sounds, etc.) occurring while the mobile device is holstered could be signs of nefarious processes executing on the device (e.g., to track or spy on the user).

Other examples of sensor level observations related to usage or external environments may include, detecting NFC signaling, collecting information from a credit card scanner, barcode scanner, or mobile tag reader, detecting the presence of a Universal Serial Bus (USB) power charging source, detecting that a keyboard or auxiliary device has been coupled to the mobile device, detecting that the mobile device has been coupled to a computing device (e.g., via USB, etc.), determining whether an LED, flash, flashlight, or light source has been modified or disabled (e.g., maliciously disabling an emergency signaling app, etc.), detecting that a speaker or microphone has been turned on or powered, detecting a charging or power event, detecting that the mobile device is being used as a game controller, etc. Sensor level observations may also include collecting information from medical or healthcare sensors or from scanning the user's body, collecting information from an external sensor plugged into the USB/audio jack, collecting information from a tactile or haptic sensor (e.g., via a vibrator interface, etc.), collecting information pertaining to the thermal state of the mobile device, etc.

To reduce the number of factors monitored to a manageable level, in an aspect, the behavior observer module 202 may perform coarse observations by monitoring/observing an initial set of behaviors or factors that are a small subset of all factors that could contribute to the mobile device's degradation. In an aspect, the behavior observer module 202 may receive the initial set of behaviors and/or factors from a server module 301 and/or a component in a cloud service or network 118. In an aspect, the initial set of behaviors/factors may be specified in data/behavior models received from the server module 301 or cloud service/network 118. In an aspect, the initial set of behaviors/factors may be specified in a reduced feature model (RFMs).

The behavior analyzer module 204 and/or classifier module 208 may receive the observations from the behavior observer module 202, compare the received information (i.e., observations) with contextual information received from the external context information module 206, and identify subsystems, processes, and/or applications associated with the received observations that are contributing to (or are likely to contribute to) the device's degradation over time, or which may otherwise cause problems on the device.

In an aspect, the behavior analyzer module 204 and/or classifier module 208 may include intelligence for utilizing a limited set of information (i.e., coarse observations) to identify behaviors, processes, or programs that are contributing to—or are likely to contribute to—the device's degradation over time, or which may otherwise cause problems on the device. For example, the behavior analyzer module 204 may be configured to analyze information (e.g., in the form of observations) collected from various modules (e.g., the behavior observer module 202, external context information module 206, etc.), learn the normal operational behaviors of the mobile device, and generate one or more behavior vectors based the results of the comparisons. The behavior analyzer module 204 may send the generated behavior vectors to the classifier module 208 for further analysis.

The classifier module 208 may receive the behavior vectors and compare them to one or more behavior modules to determine whether a particular mobile device behavior, software application, or process is performance-degrading/malicious, benign, or suspicious.

When the classifier module 208 determines that a behavior, software application, or process is malicious or performance-degrading, the classifier module 208 may notify the actuator module 210, which may perform various actions or operations to correct mobile device behaviors determined to be malicious or performance-degrading and/or perform operations to heal, cure, isolate, or otherwise fix the identified problem.

When the classifier module 208 determines that a behavior, software application, or process is suspicious, the classifier module 208 may notify the behavior observer module 202, which may adjust the granularity of its observations (i.e., the level of detail at which mobile device behaviors are observed) and/or change the behaviors that are observed based on information received from the classifier module 208 (e.g., results of the real-time analysis operations), generate or collect new or additional behavior information, and send the new/additional information to the behavior analyzer module 204 and/or classifier module 208 for further analysis/classification. Such feedback communications between the behavior observer module 202 and the classifier module 208 enable the mobile device 102 to recursively increase the granularity of the observations (i.e., make finer or more detailed observations) or change the features/behaviors that are observed until a source of a suspicious or performance-degrading mobile device behavior is identified, until a processing or battery consumption threshold is reached, or until the mobile device processor determines that the source of the suspicious or performance-degrading mobile device behavior cannot be identified from further increases in observation granularity. Such feedback communication also enable the mobile device 102 to adjust or modify the data/behavior models locally in the mobile device without consuming an excessive amount of the mobile device's processing, memory, or energy resources.

In an aspect, the behavior observer module 202 and the behavior analyzer module 204 may provide, either individually or collectively, real-time behavior analysis of the computing system's behaviors to identify suspicious behavior from limited and coarse observations, to dynamically determine behaviors to observe in greater detail, and to dynamically determine the level of detail required for the observations. In this manner, the behavior observer module 202 enables the mobile device 102 to efficiently identify and prevent problems from occurring on mobile devices without requiring a large amount of processor, memory, or battery resources on the device.

Figure 3:
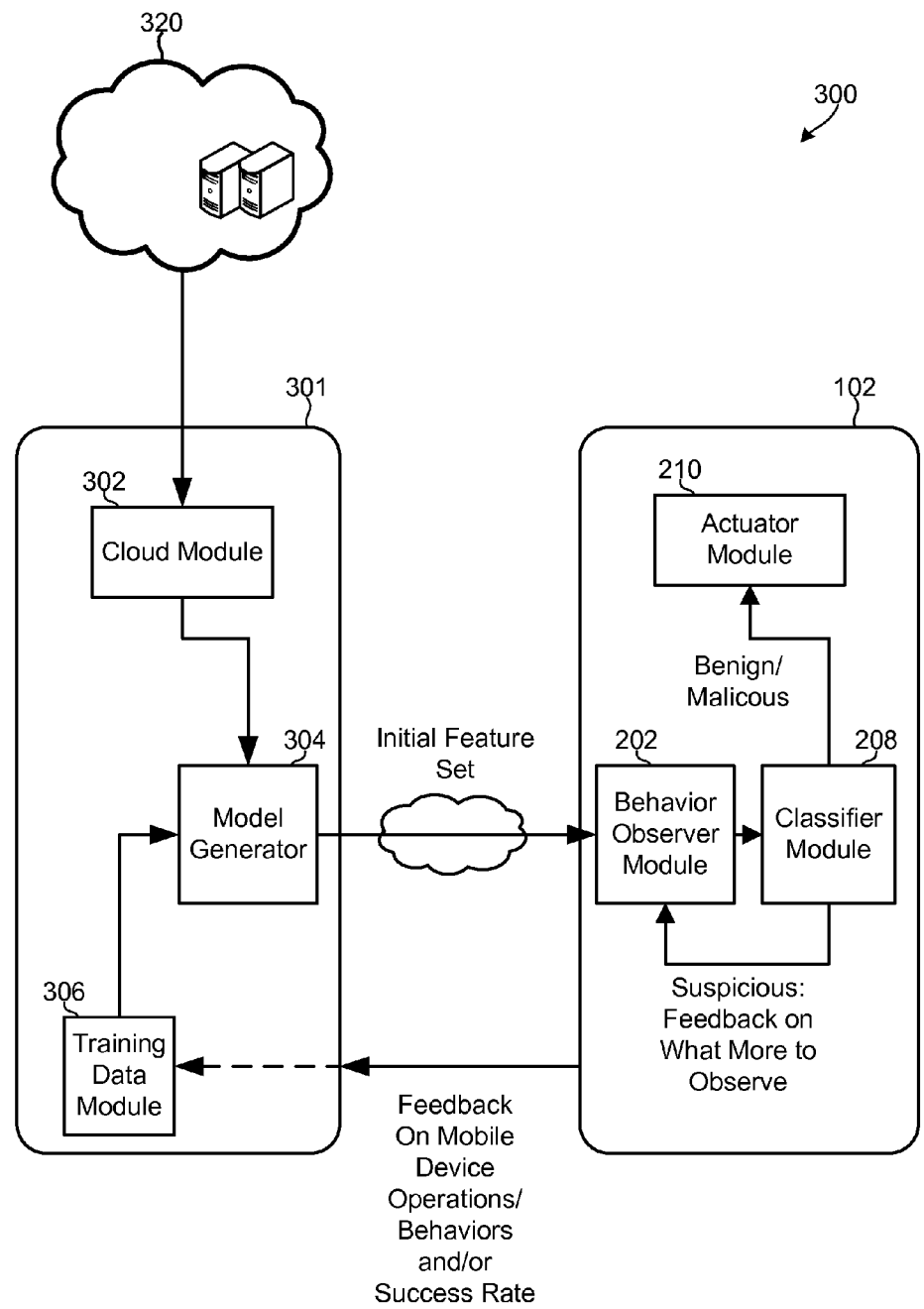
FIG. 3 is a block diagram illustrating logical components and information flows in an example system suitable for generating an updating classifier and data/behavior models in accordance with various aspects.

FIG. 3 illustrates example components and information flows in an aspect system 300 that includes a server module 301 configured to work in conjunction with a cloud service/network server 320 to intelligently and efficiently identify actively malicious or poorly written software applications and/or suspicious or performance-degrading mobile device behaviors on the mobile device 102 without consuming an excessive amount of processing, memory, or energy resources of the mobile device. In the example illustrated in FIG. 3, the server module 301 includes a cloud module 302, a model generator 304 module, and a training data module 306. The mobile device 102 includes a behavior observer module 202, a classifier module 208, and an actuator module 210. In an aspect, the classifier module 208 may be included in, or as part of, the behavior analyzer module 204 (illustrated in FIG. 2). In an aspect, the model generator 304 module may be a real-time online classifier. In various aspects, the server module 301 may be implemented in a network server or the mobile device 102.

The cloud module 302 may be configured to receive a large amount of information from a cloud service/network 118 and generate a full or robust data/behavior model that includes all or most of the features, data points, and/or factors that could contribute to the mobile device's degradation over time.

The model generator 304 module may generate lean data/behavior models based on full model generated in the cloud module 302. In an aspect, generating the lean data/behavior models may include generating one or more reduced feature models (RFMs) that include a subset of the features and data points included in the full model generated by the cloud module 302. In an aspect, the model generator 304 may generate a lean data/behavior model that includes an initial feature set (e.g., an initial reduced feature model) that includes information determined to have a highest probability of enabling the classifier module 208 to conclusively determine whether a particular mobile device behavior is benign or malicious/performance-degrading. The model generator 304 may send the generated lean models to the behavior observer module 202.

The behavior observer module 202 may monitor/observe mobile device behaviors based on the received model, generate observations, and send the observations to the classifier module 208. The classifier module 208 may perform real-time analysis operations, which may include applying data/behavior models to behavior information collected by the behavior observer module 202 to determine whether a mobile device behavior is benign, suspicious, or malicious/performance-degrading. The classifier module 208 may determine that a mobile device behavior is suspicious when the classifier module 208 does not have sufficient information to classify or conclusively determine that the behavior is either benign or malicious.

The classifier module 208 may be configured to communicate the results of its real-time analysis operations to the behavior observer module 202 when the classifier module 208 determines that a device behavior is suspicious. The behavior observer module 202 may adjust the granularity of its observations (i.e., the level of detail at which mobile device behaviors are observed) and/or change the behaviors that are observed based on information received from the classifier module 208 (e.g., based on the results of the real-time analysis operations), generate or collect new or additional behavior information, and send the new/additional information to the classifier module for further analysis/classification (e.g., in the form of new models). In this manner, the mobile device 102 may recursively increase the granularity of the observations (i.e., make finer or more detailed observations) or change the features/behaviors that are observed until a source of a suspicious or performance-degrading mobile device behavior is identified, until a processing or battery consumption threshold is reached, or until the mobile device processor determines that the source of the suspicious or performance-degrading mobile device behavior cannot be identified from further increases in observation granularity.

The mobile device 102 may the send the results of its operations and/or success rates associated with the application of models to the server module 301. The server module 301 may generate training data (e.g., via the training data module 306) based on the results/success rates for use by the model generator 304. The model generator may generate updated models based on the training data, and send the updated models to the mobile device 102.

Certain tasks/activities inherently require that the operating system or software application be in an execution state that supports or is compatible with those tasks/activities. When these or other similar tasks/activities are preformed in an execution state that does not support a high degree of user interaction with the mobile device, such as in the background execution state, it may be a strong indication that a mobile device behavior associated with that activity is malicious or otherwise merits additional or closer scrutiny, monitoring or analysis.

That is, the specific operating system execution state in which certain tasks/activities are performed in the mobile device may be a strong indicator of whether a mobile device behavior is malicious, suspicious, or merits closer monitoring or analysis. However, there are a large number of factors that may require monitoring in a mobile device, and collecting the operating system execution state information for each factor may not be feasible in the complex yet resources constrained systems of modern mobile devices. In an aspect, the mobile device may be configured to intelligently identify and select the factors, tasks, activities to which the operating system state is relevant in determining whether a mobile device behavior, software application, or activity is malicious or benign.

Figure 4:
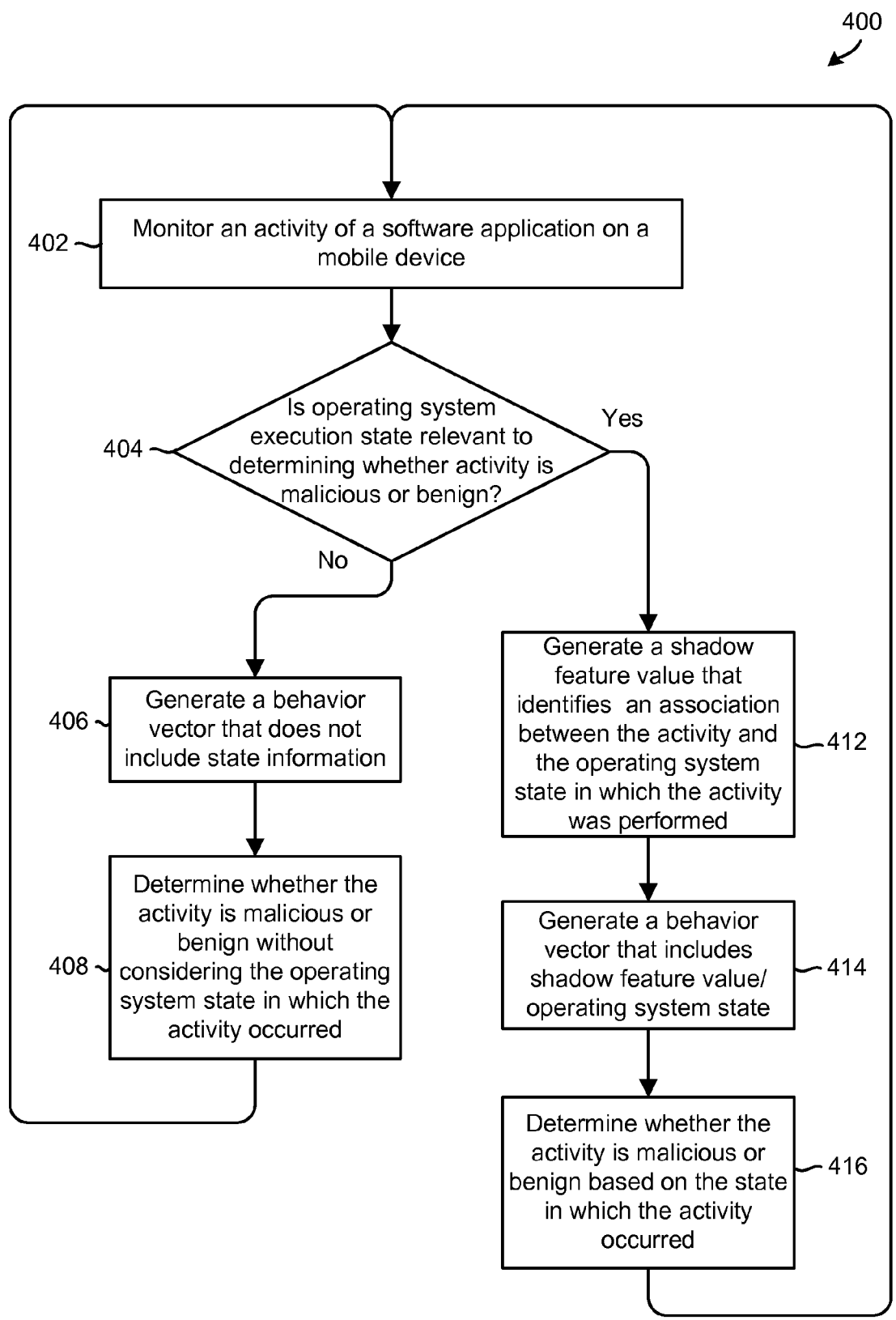
FIG. 4 is a process flow diagram illustrating an aspect method of intelligently generating behavior vectors that are suitable for use in determining whether a mobile device behavior is inconsistent with normal operation patterns without consuming an excessive amount of the processing, memory or battery resources of the mobile device.

FIG. 4 illustrates an aspect method 400 of intelligently generating behavior vectors that are suitable for use in efficiently determining whether a mobile device behaviors inconsistent with normal operation patterns without consuming an excessive amount of the processing, memory or battery resources of the mobile device. Method 400 may be performed by a processing core of a mobile device 102.

In block 402, the processing core may monitor an activity of a software application executing the mobile device. In determination block 404, the processing core may determine whether the operating system execution state of the software application during the performance of the activity is relevant to determining whether any mobile device behavior, software application, process, task, activity, etc. is malicious or inconsistent with normal operation patterns of the mobile device. In an aspect, this may be accomplished by accessing an operating state relevancy data structure that includes all the various behaviors, software applications, activities, and/or tasks for which the operating system execution state is relevant.

When the processing core determines that the operating system execution state of the software application during the performance of the activity is not relevant (i.e., determination block 404="No"), in block 406, the processing core may generate a behavior vector that does not include the operating system execution state information. In block 408, the processing core may determine whether the activity is malicious or benign based on the behavior information collected from observing/monitoring instrumented components and without considering the operating system state in which the activity occurred.

When the processing core determines that the operating system execution state of the software application during the performance of the activity is relevant for the monitored activity (i.e., determination block 404="Yes"), in block 412, the processing core may generate a shadow feature value that identifies the operating system execution state of the software application during which the activity was monitored. In block 414, the processing core may generate a behavior vector that associates the monitored activity with the shadow feature value identifying the operating system execution state. In block 416, the processing core may determine whether the activity is malicious or benign based on the operating system execution state associated with the activity.

As mentioned above, certain tasks/activities inherently require that the operating system or software application be in an execution state that supports or is compatible with those tasks/activities. For example, the use of a camera, activating a microphone to record audio, sending SMS messages, and the collection accelerometer data are all tasks/activities that require some form of user interaction with the mobile device, and thus these activities must generally be performed in the foreground or in an execution state that supports user interaction with the mobile device.

As a further example, the frequency in which certain tasks/activities are performed in the mobile device when the operating system or software application is in a particular execution state may be a strong indication that a mobile device behavior associated with that activity merits additional or closer scrutiny, monitoring and/or analysis. That is, activities such as sampling sensor data (e.g., accelerometer, gyroscope, compass, pressure sensor etc.), sampling location data, performing WiFi scans, etc. may be performed frequently when the associated software application is running in the foreground as part of a normal or benign mobile device behavior/operation, but should not be performed at that same frequently when the associated software application is running in the background. For example, sampling sensor information frequently when an application is in the background may indicate that the sensor information is being misused by a malicious application, whereas sampling that same sensor information with the same frequency may when the application is in the foreground may be part of a benign mobile device behavior. Similarly, frequent WiFi scans while the application is in the background state may indicate that calls to the location API are being circumvented by a malicious software application or that the WiFi system is being used improperly and/or degrading the overall performance and power consumption characteristics of the mobile device.

In an aspect, the mobile device may be configured to identify the tasks/activities that require that the operating system or software application be in an execution state that supports or is compatible with those tasks/activities by reading information from an operating state relevancy data structure (e.g., list, table, map, etc.) stored in a memory of the mobile device. In an aspect, the mobile device may be configured to intelligently add or remove entries, features, and executions states to the operating state relevancy data structure based on historical information (e.g., collected from prior executions, previous applications of behavior models, etc.), new information, machine learning, context modeling, and detected changes in the available information, mobile device states, environmental conditions, network conditions, mobile device performance, battery consumption levels, etc.

FIG. 5 illustrates six different execution states defined by the Android® operating system in which a software application may operate/execute. These operating system execution states include background, empty, foreground, perceptible, service, and visible. Each of these states is associated with an importance value in the Android® framework, which is listed in the table below (i.e., background state has an importance value of 400, etc.). In an aspect, the mobile device may be configured to determine whether an application is benign or malicious based on it performing one or more activities while in these or other execution states. In an aspect, this may be accomplished may comparing the above mentioned states (e.g., background, empty, foreground, perceptible, service, and visible) to an operating system execution state of an activity monitored in the mobile device. In other aspects, this may be accomplished by mapping or associating these states (e.g., background, empty, foreground, perceptible, service, and visible) to other states of the mobile device and/or to other information that may be used to evaluate the operating system execution state information collected for a monitored activity.

Figure 6:
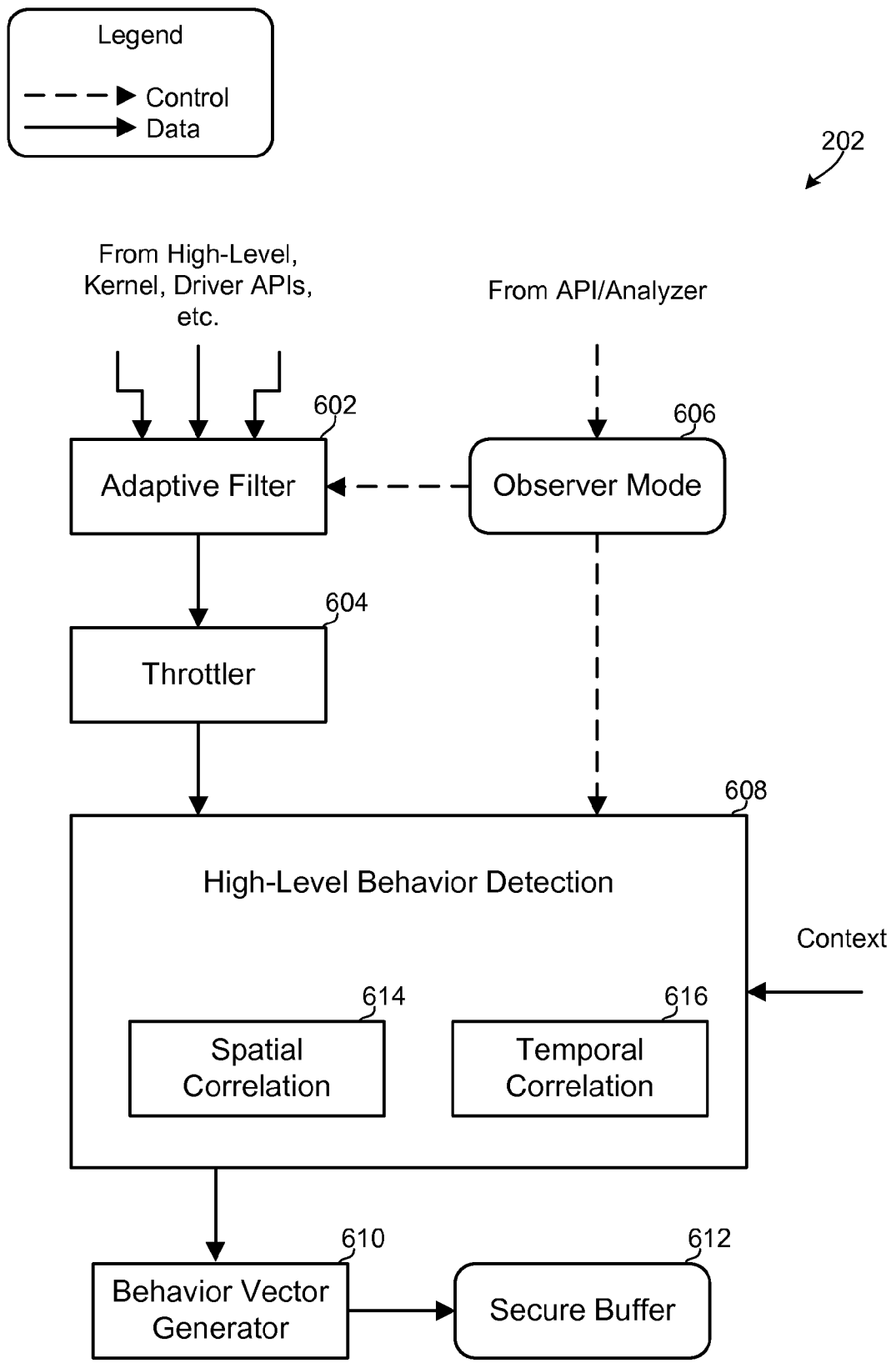
FIGS. 6 and 7 are component block diagrams illustrating logical components and information flows in a computing system implementing observer modules and observer daemons in accordance with the various aspects.

FIG. 6 illustrates example logical components and information flows in a behavior observer module 202 of a computing system configured to perform dynamic and adaptive observations in accordance with an aspect. The behavior observer module 202 may include an adaptive filter module 602, a throttle module 604, an observer mode module 606, a high-level behavior detection module 608, a behavior vector generator 610, and a secure buffer 612. The high-level behavior detection module 608 may include a spatial correlation module 614 and a temporal correlation module 616.

The observer mode module 606 may receive control information from various sources, which may include an analyzer unit (e.g., the behavior analyzer module 204 described above with reference to FIG. 2) and/or an application API. The observer mode module 606 may send control information pertaining to various observer modes to the adaptive filter module 602 and the high-level behavior detection module 608.

The adaptive filter module 602 may receive data/information from multiple sources, and intelligently filter the received information to generate a smaller subset of information selected from the received information. This filter may be adapted based on information or control received from the analyzer module, or a higher-level process communicating through an API. The filtered information may be sent to the throttle module 604, which may be responsible for controlling the amount of information flowing from the filter to ensure that the high-level behavior detection module 608 does not become flooded or overloaded with requests or information.

The high-level behavior detection module 608 may receive data/information from the throttle module 604, control information from the observer mode module 606, and context information from other components of the mobile device. The high-level behavior detection module 608 may use the received information to perform spatial and temporal correlations to detect or identify high level behaviors that may cause the device to perform at sub-optimal levels. The results of the spatial and temporal correlations may be sent to the behavior vector generator 610, which may receive the correlation information and generate a behavior vector that describes the behaviors of particular process, application, or sub-system. In an aspect, the behavior vector generator 610 may generate the behavior vector such that each high-level behavior of a particular process, application, or sub-system is an element of the behavior vector. In an aspect, the generated behavior vector may be stored in a secure buffer 612. Examples of high-level behavior detection may include detection of the existence of a particular event, the amount or frequency of another event, the relationship between multiple events, the order in which events occur, time differences between the occurrence of certain events, etc.

In the various aspects, the behavior observer module 202 may perform adaptive observations and control the observation granularity. That is, the behavior observer module 202 may dynamically identify the relevant behaviors that are to be observed, and dynamically determine the level of detail at which the identified behaviors are to be observed. In this manner, the behavior observer module 202 enables the system to monitor the behaviors of the mobile device at various levels (e.g., multiple coarse and fine levels). The behavior observer module 202 may enable the system to adapt to what is being observed. The behavior observer module 202 may enable the system to dynamically change the factors/behaviors being observed based on a focused subset of information, which may be obtained from a wide verity of sources.

As discussed above, the behavior observer module 202 may perform adaptive observation techniques and control the observation granularity based on information received from a variety of sources. For example, the high-level behavior detection module 608 may receive information from the throttle module 604, the observer mode module 606, and context information received from other components (e.g., sensors) of the mobile device. As an example, a high-level behavior detection module 608 performing temporal correlations might detect that a camera has been used and that the mobile device is attempting to upload the picture to a server. The high-level behavior detection module 608 may also perform spatial correlations to determine whether an application on the mobile device took the picture while the device was holstered and attached to the user's belt. The high-level behavior detection module 608 may determine whether this detected high-level behavior (e.g., usage of the camera while holstered) is a behavior that is acceptable or common, which may be achieved by comparing the current behavior with past behaviors of the mobile device and/or accessing information collected from a plurality of devices (e.g., information received from a crowd-sourcing server). Since taking pictures and uploading them to a server while holstered is an unusual behavior (as may be determined from observed normal behaviors in the context of being holstered), in this situation the high-level behavior detection module 608 may recognize this as a potentially threatening behavior and initiate an appropriate response (e.g., shutting off the camera, sounding an alarm, etc.).

In an aspect, the behavior observer module 202 may be implemented in multiple parts.

Figure 7:
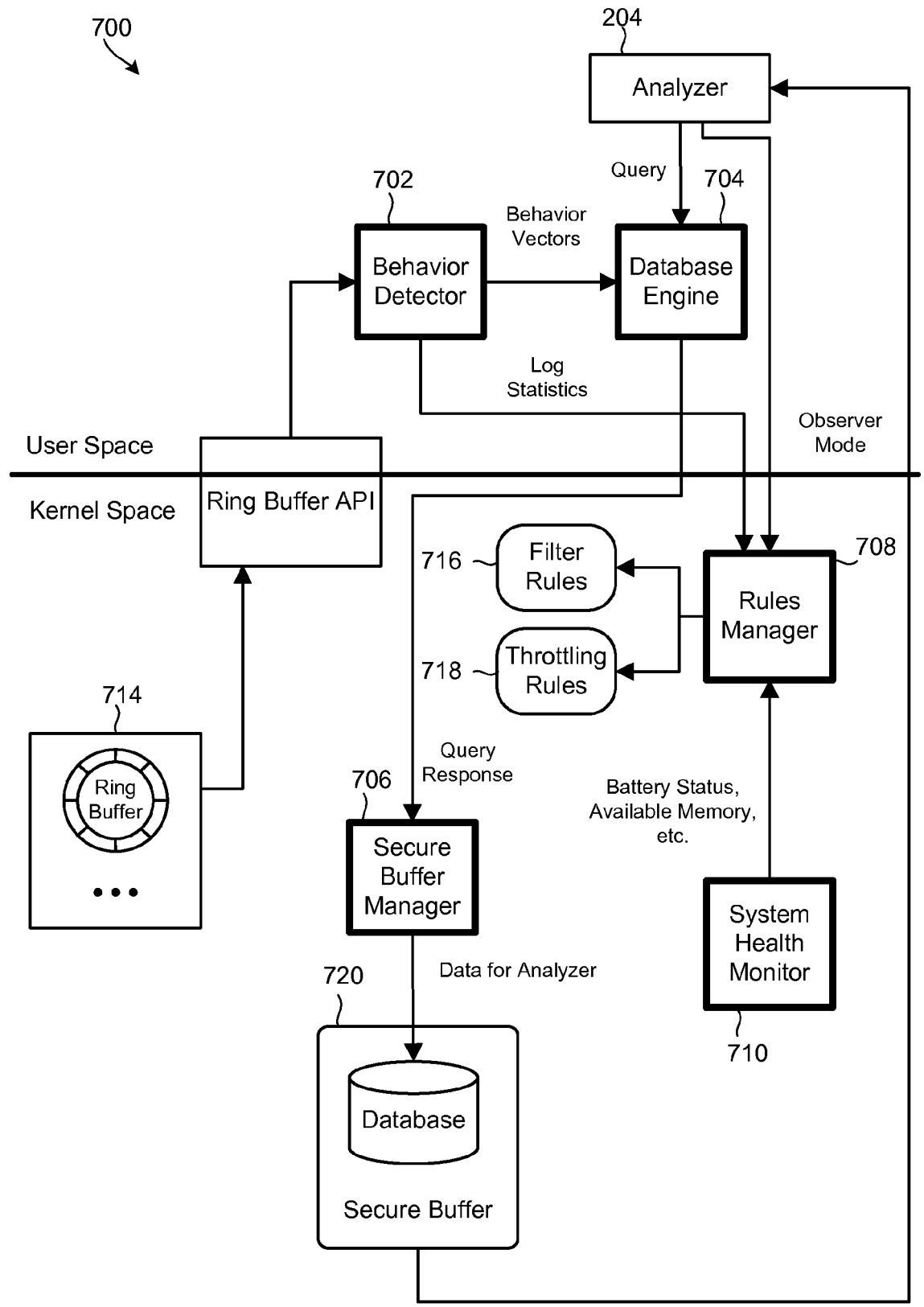

FIG. 7 illustrates logical components and information flows in a computing system 700 implementing an aspect observer daemon. In the example illustrated in FIG. 7, the computing system 700 includes a behavior detector 702 module, a database engine 704 module, and a behavior analyzer module 204 in the user space, and a ring buffer 714, a filter rules 716 module, a throttling rules 718 module, and a secure buffer 720 in the kernel space. The computing system 700 may further include an observer daemon that includes the behavior detector 702 and the database engine 704 in the user space, and the secure buffer manager 706, the rules manager 708, and the system health monitor 710 in the kernel space.

The various aspects may provide cross-layer observations on mobile devices encompassing webkit, SDK, NDK, kernel, drivers, and hardware in order to characterize system behavior. The behavior observations may be made in real time.

The observer module may perform adaptive observation techniques and control the observation granularity. As discussed above, there are a large number (i.e., thousands) of factors that could contribute to the mobile device's degradation, and it may not be feasible to monitor/observe all of the different factors that may contribute to the degradation of the device's performance. To overcome this, the various aspects dynamically identify the relevant behaviors that are to be observed, and dynamically determine the level of detail at which the identified behaviors are to be observed.

Figure 8:
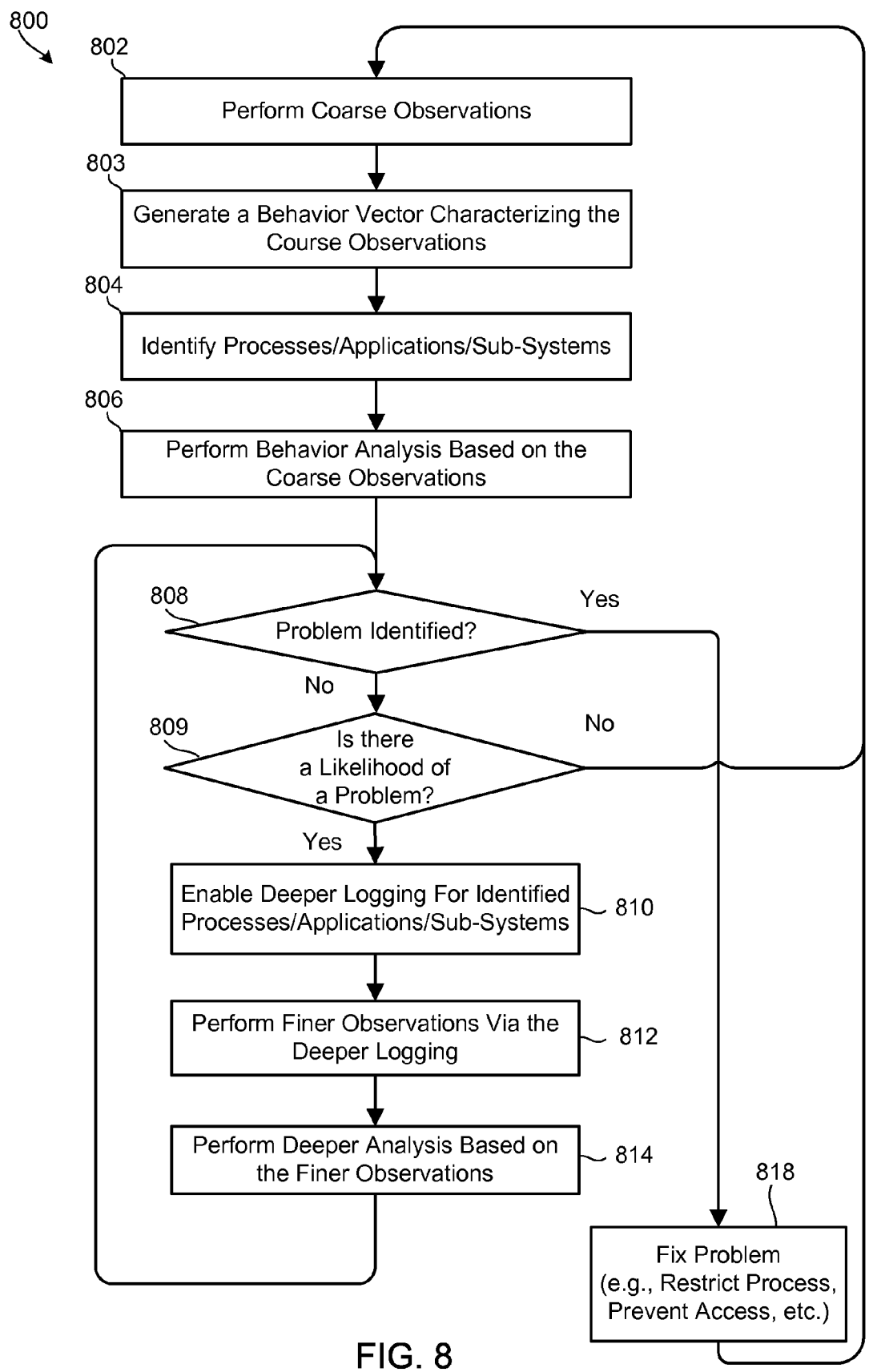
FIG. 8 is a process flow diagram illustrating an aspect method for performing adaptive observations on mobile devices.

FIG. 8 illustrates an example method 800 for performing dynamic and adaptive observations in accordance with an aspect. In block 802, the mobile device processor may perform coarse observations by monitoring/observing a subset of large number factors/behaviors that could contribute to the mobile device's degradation. In block 803, the mobile device processor may generate a behavior vector characterizing the coarse observations and/or the mobile device behavior based on the coarse observations. In block 804, the mobile device processor may identify subsystems, processes, and/or applications associated with the coarse observations that may potentially contribute to the mobile device's degradation. This may be achieved, for example, by comparing information received from multiple sources with contextual information received from sensors of the mobile device. In block 806, the mobile device processor may perform behavioral analysis operations based on the coarse observations. In aspect, as part of blocks 803 and 804, the mobile device processor may perform one or more of the operations discussed above.

In determination block 808, the mobile device processor may determine whether suspicious behaviors or potential problems can be identified and corrected based on the results of the behavioral analysis. When the mobile device processor determines that the suspicious behaviors or potential problems can be identified and corrected based on the results of the behavioral analysis (i.e., determination block 808="Yes"), in block 818, the processor may initiate a process to correct the behavior and return to block 802 to perform additional coarse observations.

When the mobile device processor determines that the suspicious behaviors or potential problems can not be identified and/or corrected based on the results of the behavioral analysis (i.e., determination block 808="No"), in determination block 809 the mobile device processor may determine whether there is a likelihood of a problem. In an aspect, the mobile device processor may determine that there is a likelihood of a problem by computing a probability of the mobile device encountering potential problems and/or engaging in suspicious behaviors, and determining whether the computed probability is greater than a predetermined threshold. When the mobile device processor determines that the computed probability is not greater than the predetermined threshold and/or there is not a likelihood that suspicious behaviors or potential problems exist and/or are detectable (i.e., determination block 809="No"), the processor may return to block 802 to perform additional coarse observations.

When the mobile device processor determines that there is a likelihood that suspicious behaviors or potential problems exist and/or are detectable (i.e., determination block 809="Yes"), in block 810, the mobile device processor may perform deeper logging/observations or final logging on the identified subsystems, processes or applications. In block 812, the mobile device processor may perform deeper and more detailed observations on the identified subsystems, processes or applications. In block 814, the mobile device processor may perform further and/or deeper behavioral analysis based on the deeper and more detailed observations. In determination block 808, the mobile device processor may again determine whether the suspicious behaviors or potential problems can be identified and corrected based on the results of the deeper behavioral analysis. When the mobile device processor determines that the suspicious behaviors or potential problems can not be identified and corrected based on the results of the deeper behavioral analysis (i.e., determination block 808="No"), the processor may repeat the operations in blocks 810-814 until the level of detail is fine enough to identify the problem or until it is determined that the problem cannot be identified with additional detail or that no problem exists.

When the mobile device processor determines that the suspicious behaviors or potential problems can be identified and corrected based on the results of the deeper behavioral analysis (i.e., determination block 808="Yes"), in block 818, the mobile device processor may perform operations to correct the problem/behavior, and the processor may return to block 802 to perform additional operations.

In an aspect, as part of blocks 802-818 of method 800, the mobile device processor may perform real-time behavior analysis of the system's behaviors to identify suspicious behavior from limited and coarse observations, to dynamically determine the behaviors to observe in greater detail, and to dynamically determine the precise level of detail required for the observations. This enables the mobile device processor to efficiently identify and prevent problems from occurring, without requiring the use of a large amount of processor, memory, or battery resources on the device.

Figure 9:
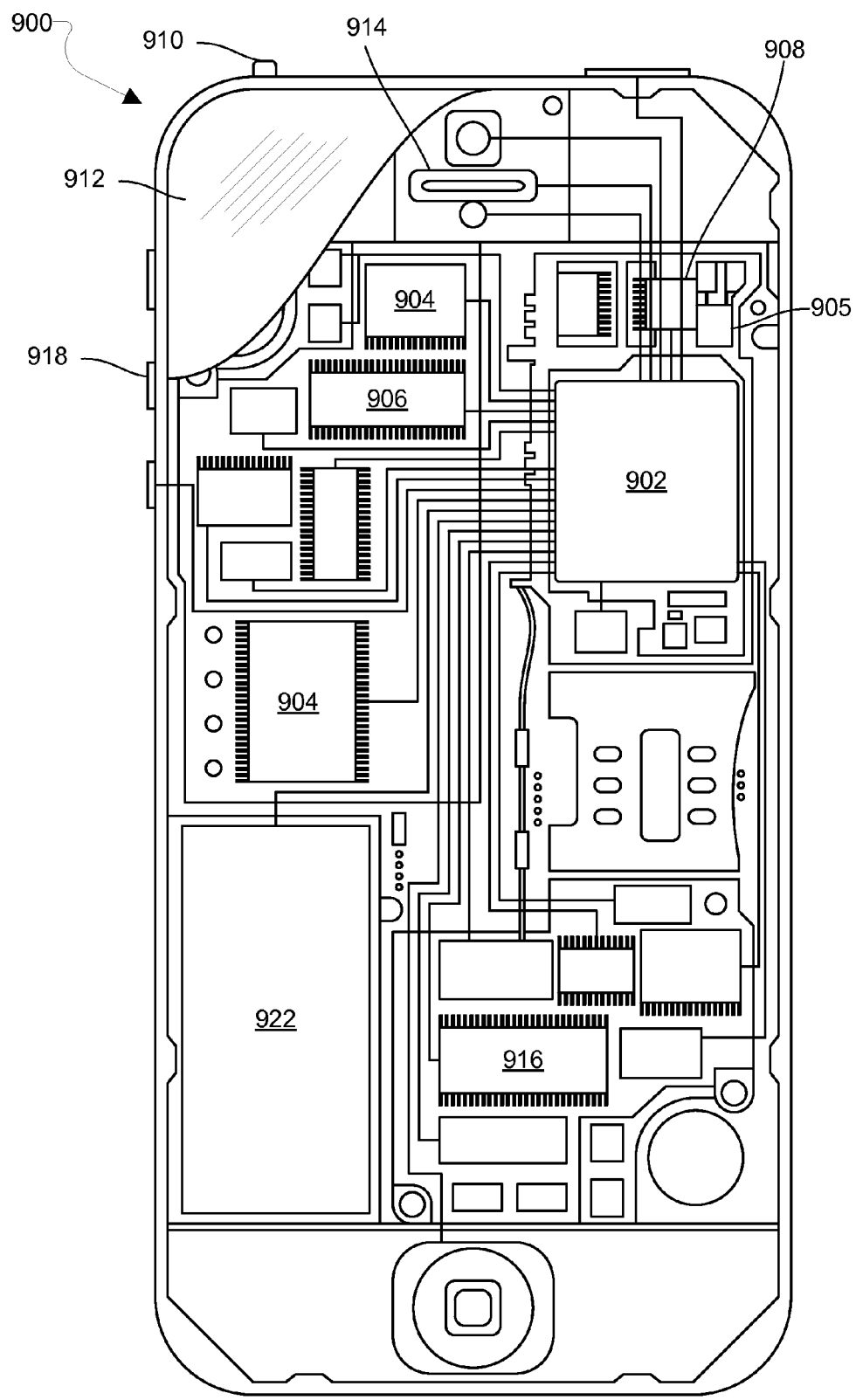
FIG. 9 is a component block diagram of an example mobile device suitable for use with the various aspects.

The various aspects may be implemented on a variety of mobile computing devices, an example of which is illustrated in FIG. 9 in the form of a smartphone 900. The smartphone 900 may include a processor 902 coupled to a touchscreen controller 904 and an internal memory 906. The processor 902 may be one or more multicore ICs designated for general or specific processing tasks. The internal memory 906 may be volatile or non-volatile memory, and may also be secure and/or encrypted memory, or unsecure and/or unencrypted memory, or any combination thereof. The touchscreen controller 904 and the processor 902 may also be coupled to a touchscreen panel 912, such as a resistive-sensing touchscreen, capacitive-sensing touchscreen, infrared sensing touchscreen, etc.

The smartphone 900 may have one or more radio signal transceivers 908 (e.g., Peanut®, Bluetooth®, Zigbee®, Wi-Fi, radio frequency radio) and antennae 910, for sending and receiving, coupled to each other and/or to the processor 902. The transceivers 908 and antennae 910 may be used with the above-mentioned circuitry to implement the various wireless transmission protocol stacks and interfaces. The multicore device 900 may include a cellular network wireless modem chip 916 that enables communication via a cellular network and is coupled to the processor 902. Smartphones 900 typically also include a speaker 914 and menu selection buttons or rocker switches 918 for receiving user inputs.

A typical smartphone 900 also includes a sound encoding/decoding (CODEC) circuit 922, which digitizes sound received from a microphone into data packets suitable for wireless transmission and decodes received sound data packets to generate analog signals that are provided to the speaker to generate sound. Also, one or more of the processor 902, wireless transceiver 905 and CODEC 922 may include a digital signal processor (DSP) circuit (not shown separately).

Figure 10:
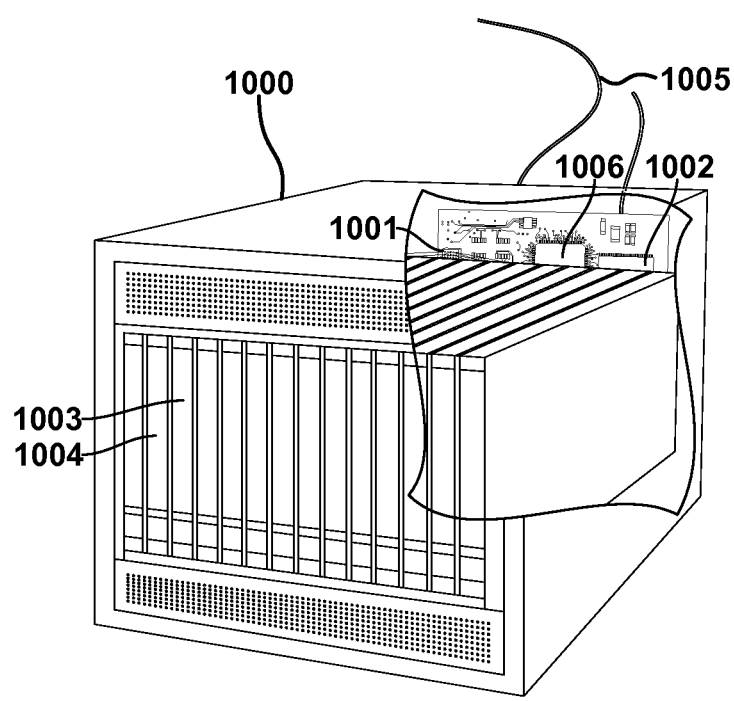
FIG. 10 is a component block diagram of an example server computer suitable for use with the various aspects.

Portions of the aspect methods may be accomplished in a client-server architecture with some of the processing occurring in a server, such as maintaining databases of normal operational behaviors, which may be accessed by a mobile device processor while executing the aspect methods. Such aspects may be implemented on any of a variety of commercially available server devices, such as the server 1000 illustrated in FIG. 10. Such a server 1000 typically includes a processor 1001 coupled to volatile memory 1002 and a large capacity nonvolatile memory, such as a disk drive 1003. The server 1000 may also include a floppy disc drive, compact disc (CD) or digital versatile disc (DVD) disc drive 1004 coupled to the processor 1001. The server 1000 may also include network access ports 1006 coupled to the processor 1001 for establishing data connections with a network 1005, such as a local area network coupled to other broadcast system computers and servers.

The processors 902, 1001 may be any programmable microprocessor, microcomputer or multiple processor chip or chips that can be configured by software instructions (applications) to perform a variety of functions, including the functions of the various aspects described below. In some mobile devices, multiple processors 902 may be provided, such as one processor dedicated to wireless communication functions and one processor dedicated to running other applications. Typically, software applications may be stored in the internal memory 906, 1002, 1003 before they are accessed and loaded into the processor 902, 1001. The processor 902, 1001 may include internal memory sufficient to store the application software instructions.

The term "performance degradation" is used in this application to refer to a wide variety of undesirable mobile device operations and characteristics, such as longer processing times, slower real time responsiveness, lower battery life, loss of private data, malicious economic activity (e.g., sending unauthorized premium SMS message), denial of service (DoS), operations relating to commandeering the mobile device or utilizing the phone for spying or botnet activities, etc.

Generally, a behavior vector may be a one-dimensional array, an n-dimensional array of numerical features, an ordered list of events, a feature vector, a numerical representation of one or more objects, conditions or events, a state machine, etc. In an aspect, the behavior vector may include one or more behaviors. In various aspects, a behavior may be represented as a number value or a structure that stores number values (e.g., vector, list, array, etc.).

Computer program code or "program code" for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

Many mobile computing devices operating system kernels are organized into a user space (where non-privileged code runs) and a kernel space (where privileged code runs). This separation is of particular importance in Android® and other general public license (GPL) environments where code that is part of the kernel space must be GPL licensed, while code running in the user-space may not be GPL licensed. It should be understood that the various software components/modules discussed here may be implemented in either the kernel space or the user space, unless expressly stated otherwise.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

As used in this application, the terms "component," "module," "system," "engine," "generator," "manager" and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, flash memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method of observing mobile device behaviors in a mobile device to recognize mobile device behaviors that are benign, the method comprising:
    monitoring in a processor of the mobile device an activity of a software application or process to collect behavior information;
    using the collected behavior information to generate a behavior vector information structure that characterizes the monitored activity via a plurality of numbers;
    determining whether an operating system execution state of the software application or process is relevant to determining whether the monitored activity is benign;
    generating a shadow feature value that identifies the operating system execution state of the software application or process during which the activity was monitored and including the generated shadow feature value in the generated behavior vector information structure in response to determining that the operating system execution state is relevant to determining whether the monitored activity is benign; and
    using the generated behavior vector information structure to determine whether the activity is benign.

2. The method of claim 1, wherein using the generated behavior vector information structure to determine whether the activity is benign comprises:
    applying the behavior vector information structure to a classifier model to generate an analysis result; and
    classifying the activity as benign based on the generated analysis result.

3. The method of claim 2, further comprising:
    updating the classifier model based on the collected behavior information.

4. A mobile computing device, comprising:
    a processor configured with processor-executable instructions to perform operations comprising:
        monitoring an activity of a software application or process to collect behavior information;
        using the collected behavior information to generate a behavior vector information structure that characterizes the monitored activity via a plurality of numbers;
        determining whether an operating system execution state of the software application or process is relevant to determining whether the monitored activity is benign;
        generating a shadow feature value that identifies the operating system execution state of the software application or process during which the activity was monitored and including the generated shadow feature value in the generated behavior vector information structure in response to determining that the operating system execution state is relevant to determining whether the monitored activity is benign; and
        using the generated behavior vector information structure to determine whether the activity is benign.

5. The mobile computing device of claim 4, wherein the processor is configured with processor-executable instructions to perform operations such that using the generated behavior vector information structure to determine whether the activity is benign comprises:
    applying the behavior vector information structure to a classifier model to generate an analysis result; and
    classifying the activity as benign based on the generated analysis result.

6. The mobile computing device of claim 5, wherein the processor is configured with processor-executable instructions to perform operations further comprising:
    updating the classifier model based on the collected behavior information.

7. A non-transitory processor readable storage medium having stored thereon processor-executable software instructions configured to cause a mobile device processor to perform operations comprising:
    monitoring an activity of a software application or process to collect behavior information;
    using the collected behavior information to generate a behavior vector information structure that characterizes the monitored activity via a plurality of numbers;
    determining whether an operating system execution state of the software application or process is relevant to determining whether the monitored activity is benign;
    generating a shadow feature value that identifies the operating system execution state of the software application or process during which the activity was monitored and including the generated shadow feature value in the generated behavior vector information structure in response to determining that the operating system execution state is relevant to determining whether the monitored activity is benign; and using the generated behavior vector information structure to determine whether the activity is benign.

8. The non-transitory processor readable storage medium of claim 7, wherein the stored processor-executable software instructions are configured to cause the mobile device processor to perform operations such that using the generated behavior vector information structure to determine whether the activity is benign comprises:

applying the behavior vector information structure to a classifier model to generate an analysis result; and classifying the activity as benign based on the generated analysis result.

9. The non-transitory processor readable storage medium of claim 8, wherein the stored processor-executable software instructions are configured to cause the mobile device processor to perform operations further comprising:

updating the classifier model based on the collected behavior information.

\* \* \* \* \*